(12) United States Patent
Martin

(10) Patent No.: US 10,821,927 B1
(45) Date of Patent: Nov. 3, 2020

(54) BUMPER PLUG

(71) Applicant: Blake Martin, Greensboro, NC (US)

(72) Inventor: Blake Martin, Greensboro, NC (US)

(73) Assignee: Camco Manufacturing, Inc., Greensboro, NC (US)

( * ) Notice: Subject to any disclaimer, the term of this patent is extended or adjusted under 35 U.S.C. 154(b) by 297 days.

(21) Appl. No.: 16/019,058

(22) Filed: Jun. 26, 2018

(51) Int. Cl.
*B60R 19/48* (2006.01)
*B60R 19/02* (2006.01)

(52) U.S. Cl.
CPC ............ *B60R 19/48* (2013.01); *B60R 19/023* (2013.01)

(58) Field of Classification Search
CPC ........ B60R 19/48; B60R 15/04; B60R 19/023
USPC .................................................. 293/117, 106
See application file for complete search history.

(56) References Cited

U.S. PATENT DOCUMENTS

| | | | |
|---|---|---|---|
| 4,674,933 A * | 6/1987 | Brown | A01D 87/127 224/402 |
| 4,678,011 A | 7/1987 | Weber | |
| 4,838,315 A | 6/1989 | Gunn | |
| 4,854,349 A | 8/1989 | Foreman | |
| 4,979,843 A | 12/1990 | Perry | |
| 5,096,154 A | 3/1992 | Ellis | |
| 5,288,000 A * | 2/1994 | Adamson | B60R 11/06 224/522 |
| 6,755,451 B2 | 6/2004 | Jones | |
| D677,203 S | 3/2013 | Russell et al. | |
| 8,672,371 B1 | 3/2014 | Russell et al. | |
| D731,030 S | 6/2015 | Tyler | |
| D780,628 S | 3/2017 | Peach et al. | |
| 9,649,996 B1 | 5/2017 | Mohlencamp | |
| 2008/0265229 A1 | 10/2008 | DiMartino | |

OTHER PUBLICATIONS

Webpage printout from dwincorp.com/product/super-slider-adjustable-super-tube/ showing an expanable telescoping sewer hose carrier entitled "Super-Slider Adjustable Super-Tube", copyright 201 D&W Corp.

* cited by examiner

*Primary Examiner* — Joseph D. Pape
(74) *Attorney, Agent, or Firm* — Tuggle Duggins P.A.; Blake P. Hurt

(57) ABSTRACT

A plug for a bumper with a housing defining a cavity; a collar affixed to and extending from the housing, the collar defining an opening in communication with the cavity; a cap removably connected to the collar, the cap having a plurality of spaced-apart lugs on an interior surface thereof to enable the cap to be removably connected to a 4-in-1 adapter; wherein the opening defined by the collar is of sufficient size and shape to receive a 4-in-1 adapter therein when the cap is affixed to the collar, preferably by threaded screw connection. The housing has a plurality of magnets disposed on an interior surface thereof to facilitate attachment of the plug to a bumper by magnetic attraction and the cap preferably has a plurality of small scale apertures in communication with the opening and the cavity to provide ventilation while acting as a barrier to rodents, insects, etc.

20 Claims, 7 Drawing Sheets

BUMPER PLUG

FIELD OF THE INVENTION

The invention herein pertains to a plug to enclose the end of a bumper, and more particularly pertains to a bumper plug suited for the convenient storage of a 4-in-1 adapter used with sewage discharge hoses on recreational vehicles.

DESCRIPTION OF THE PRIOR ART AND OBJECTIVES OF THE INVENTION

Recreational vehicles are extremely popular and, as the term is generally understood and used herein, includes a wide range of motor vehicles and trailers that include living accommodations. The term recreational vehicle ("RV") includes motorhomes, campervans, travel trailers, pop-up campers and other vehicles that are either self-propelled or which can be towed behind another vehicle, typically a car or truck. These RV's are primarily used for vacations, camping trips, sports outings or other circumstances where temporary living accommodations are required.

Many of these RV's are very well appointed and include living space, bedroom space, as well as kitchen and bathroom facilities. Some even come equipped with laundry facilities. RV's may also contain an on-board water storage and/or a connection to allow use of a water supply at a campsite, RV park, or the like. All RV's that have a sink, shower or toilet need to have at least one storage tank to collect and hold the waste water. Separate tanks are often used for "grey water" (collected from sinks and showers) and "black water" (collected from the toilet). Waste water in the tank(s) is then periodically emptied into a dump station provided at the campground, RV park, or other location. Emptying the waste water from the storage tank involves connecting a flexible hose at one end to the tank and at the other end to the inlet for the dump station, or to a portable holding tank that is then used to transport the waste to the dumping station.

Unfortunately for RV enthusiasts, the inlet for the tanks at the dump station are not of a universal size or type. Thus, the RV owner must be prepared to connect to several different sized inlets commonly used at various dump stations. A device, known as a 4-in-1 adapter is available for that purpose. A 4-in-1 adapter permits connecting an RV drain hose to 4 different sizes of dump station inlets by defining a variety of engagement surfaces such as differing thread sizes or patterns.

Storage of the various items needed for the transfer of waste water presents significant challenges to the RV community. The hose, 4-in-1 adapter, and other items used in the process become soiled and contaminated, and need to be kept separate from other personal items or equipment. Devoting separate space for the waste disposal items on an RV with already very limited storage options is a problem. A number of prior art solutions have been proposed, as exemplified by U.S. Pat. Nos. 9,649,996 and 6,755,451, the disclosures of which are incorporated herein by reference.

Bumpers on RV's are often a four-inch square hollow metal tube and offer a convenient storage option for the sewer drain hose. Accordingly, many RV owners have turned to using the bumper of the RV as a storage solution for these items. Storage of the disposal hose in the bumper cavity, however, is not without drawbacks.

The aforementioned U.S. Pat. No. 6,755,451, for example, notes that frequent insertion and removal of the hose can result in damage to the exterior surface of the hose and storage of the hose inside the metal bumper can result in corrosion of the bumper.

U.S. Pat. No. 4,838,315 discloses a handle that can be attached to the bayonet-type fitting on the hose to facilitate withdrawing the hose from the bumper cavity. This is desirable because the hose and other items used in the transfer of grey and black water become contaminated and insertion and removal of those items from a bumper cavity can present a health & safety concern.

U.S. Pat. No. 8,672,371; U.S. Des. Pat. No. D677,203, and the aforementioned U.S. Pat. No. 4,838,315 disclose end plugs that are used to enclose the bumper cavity and prevent the contents from being lost while the RV is in motion. These end plugs also can prevent insects, bees, snakes or the like from entering the bumper cavity. The disclosures of these patents are incorporated herein by reference. Another known bumper plug, available from Camco Manufacturing Company, is a magnetic bumper plug. This plug, similar to that disclosed in U.S. Pat. No. 8,672,371, has four magnets placed on the interior corners of the plug which allow attachment of the plug to the metal bumper without additional fasteners. The plug also has a fitting on the inside that allows the standard bayonet-type fitting on the hose to be attached to the end plug, which facilitates removal of the hose from the bumper cavity in an efficient and sanitary manner.

Another drawback of storing the sewer hose in the bumper cavity is that the 4-in-1 adapter has a threaded section to attach to a 4.5 inch diameter fitting at the discharge station. Accordingly, the 4-in-1 adapter is too large to fit within the conventional bumper cavity. Thus, if the bumper cavity is used to store the sewer hose, the 4-in-1 adapter must be stored separately, which is inconvenient and can present concerns with contamination.

It is thus an object of the invention to provide a convenient, simple and inexpensive solution to permit the use of the bumper cavity or an extension thereof for storage of the 4-in-1 adapter along with the discharge hose.

Various other objectives and advantages of the present invention will become apparent to those skilled in the art as a more detailed description is set forth below.

SUMMARY OF THE INVENTION

A plug for enclosing a tubular bumper on a recreational vehicle has a housing, a collar attached to and extending from the housing, and a cap. The housing has a size and configuration in cross section to be releasably attached to the bumper and in a preferred embodiment has a plurality of magnets for magnetic attachment to a ferrous metal bumper. The collar is sized to accommodate enclosure of a 4-in-1 adapter for an RV sewer hose and is preferably circular in cross-section. In a preferred embodiment, the collar has double start threads on an internal surface thereof to facilitate threaded engagement between the collar and the cap. The cap has a plurality of spaced apart lugs on an interior surface to permit attachment of the cap to the bayonet connections on a 4-in-1 adapter. With the cap attached to the 4-in-1 adapter, the adapter can be inserted or removed from the bumper plug and threaded into an inlet on a dump station without the user having to physically come in contact with the 4-in-1 adapter. The cap may be provided with a plurality of vent holes for drying and the release of odor without granting access to the cavity by pests.

DETAILED DESCRIPTION OF THE PREFERRED EMBODIMENT AND OPERATION OF THE INVENTION

Figure 1:
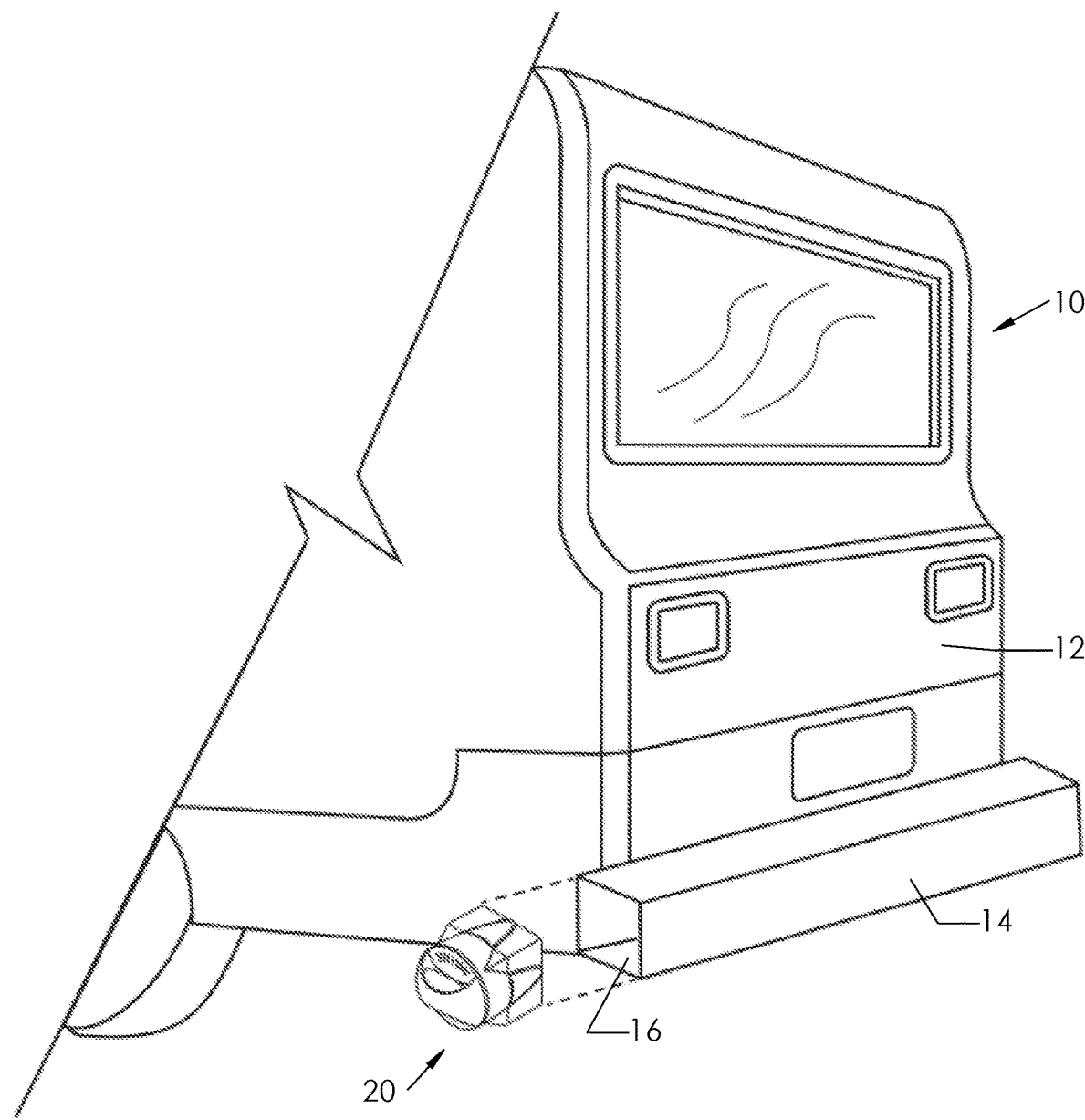
FIG. 1 is a partially fragmented schematic of a rear bumper on a recreational vehicle, showing an embodiment of the bumper plug of the invention.
Figure 2:
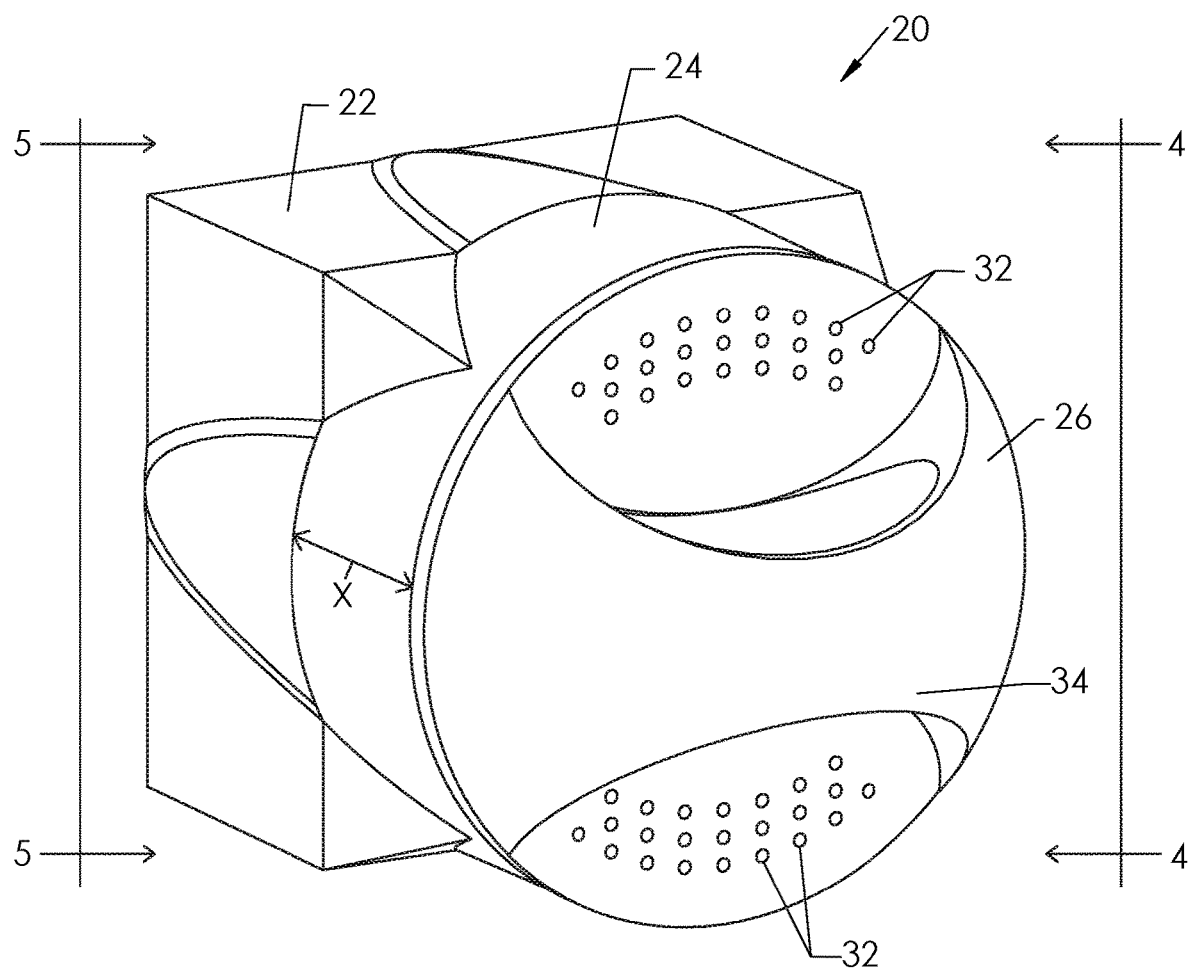
FIG. 2 is a perspective view of an embodiment of the bumper plug of the invention.

With reference to FIG. 1, a typical RV is illustrated and designated generally as 10. The RV 10 has a rear 12. A bumper 14 is disposed on the rear 12 of the RV 10. The bumper 14 is a tubular member having a square cross-sectional configuration. The two ends 16 of the bumper 14 are open (only one end 16 is shown in the view of FIG. 1). The bumper plug of the invention is designated generally at 20. As will be explained more fully below, the bumper plug 20 engages with bumper 14, and preferably fits over the end 16 thereof. The front of RV 10 may include a similarly situated bumper (not shown), but such is not discussed herein for clarity.

With reference now made to FIGS. 2-5, preferred bumper plug 20 includes a housing 22, a collar 24 and a cap 26. The housing 22 has a cross-sectional configuration designed to match the cross-sectional configuration of the bumper 16. In the embodiment shown, housing 22 has a square cross-sectional shape as most RV bumpers are square tubes, it being understood that other configurations are possible. The housing 22 defines a cavity 21 for receiving the open end 16 of the bumper 14. This association effectively creates an extension of the bumper cavity, advantageously with different dimensions than the cavity of bumper 14. It should be understood that while housing 22 and collar 24 are identified as separate structures, embodiments of bumper plug 20 may integrally incorporate these respective components therein.

Figure 5:
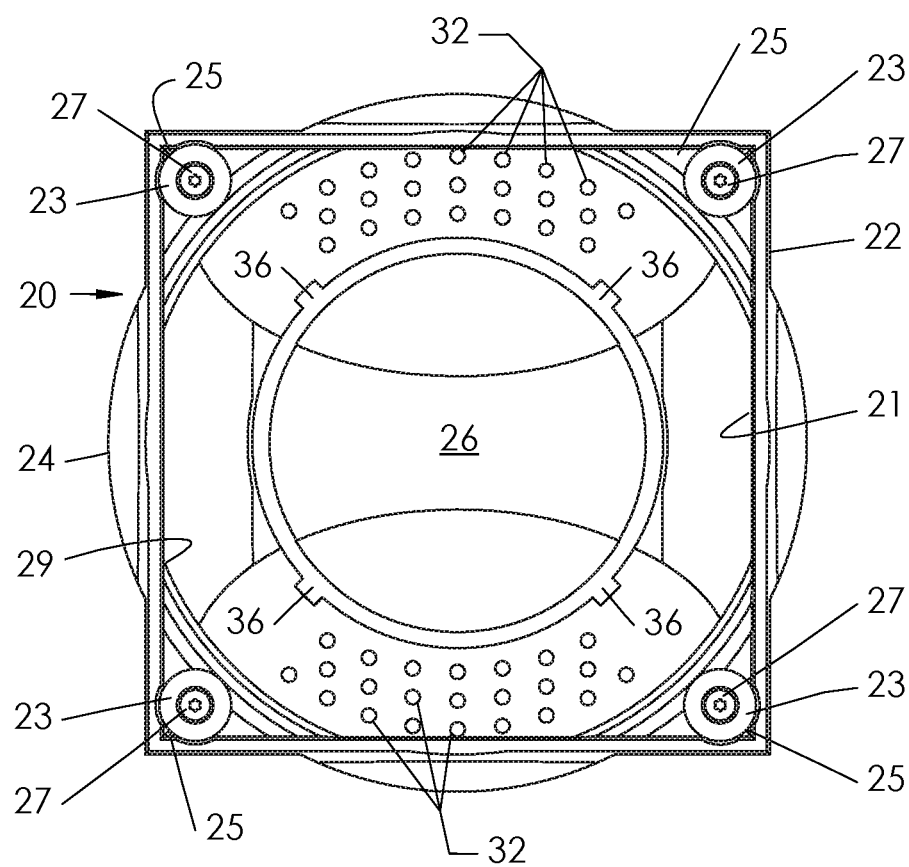
FIG. 5 is a rear elevational view of an embodiment of the bumper plug of the invention, as seen along lines and arrows 5-5 of FIG. 2.
Figure 7:
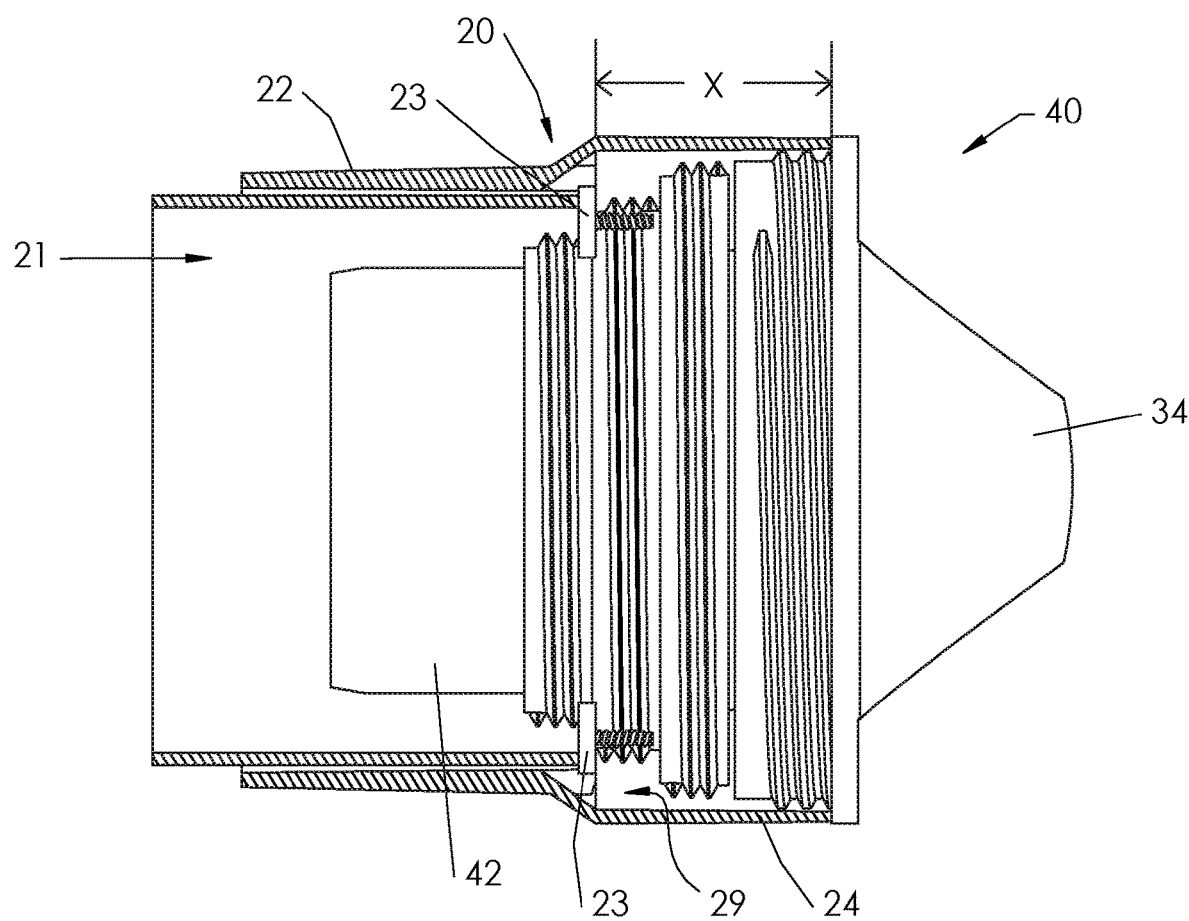
FIG. 7 is a cross-sectional, side elevational view, of an embodiment of the bumper plug of the invention, shown with the plug portion connected to a typical 4-in-1 adapter and with the cap portion connected to the body portion.

In the embodiment shown, preferred housing 22 is provided with a plurality of magnets 23 positioned on an interior surface thereof, as seen in FIGS. 5 and 7. In this embodiment, the magnets 23 are located in the four corners 25 located on an interior surface of the housing 22. While magnetic attachment of the plug to the bumper is preferred, other methods of attaching the plug may be used to advantage and are within the scope of the present invention. Magnets 23 may be held in place by screws 27, or alternatively may be held in place by other mechanical fasteners, adhesives, and the like.

Figure 3:
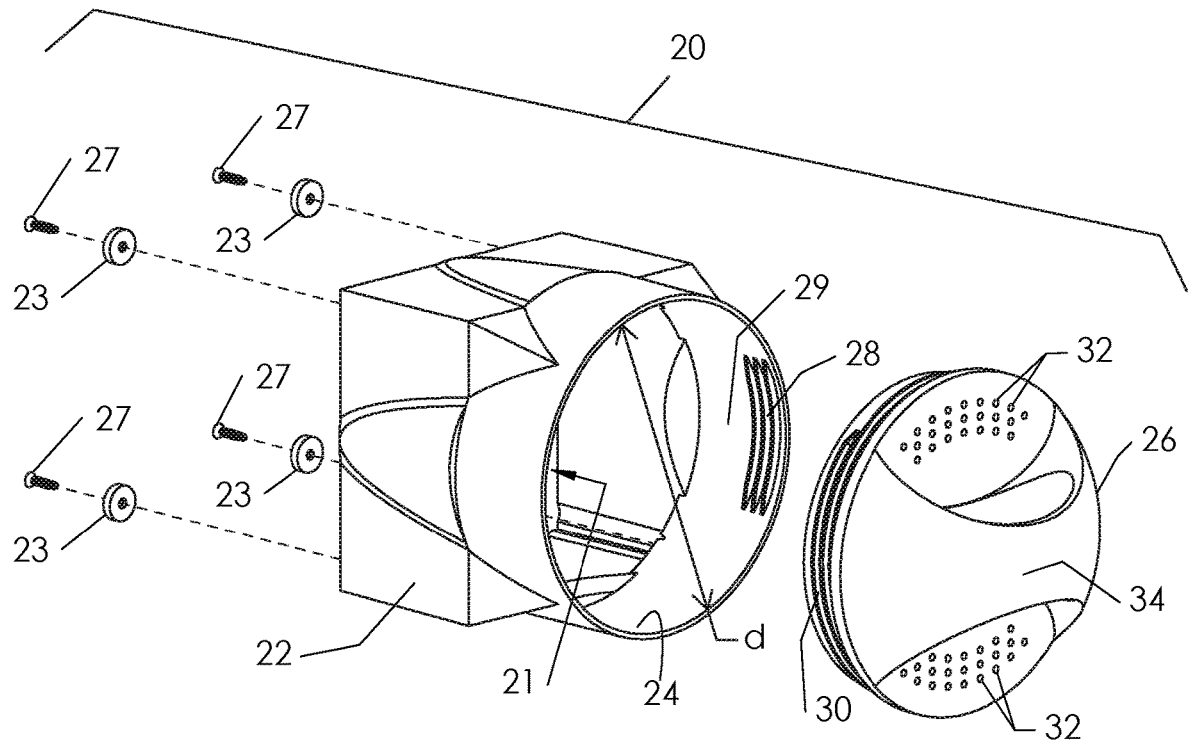
FIG. 3 is an exploded perspective view of an embodiment of the bumper plug of the invention.
Figure 4:
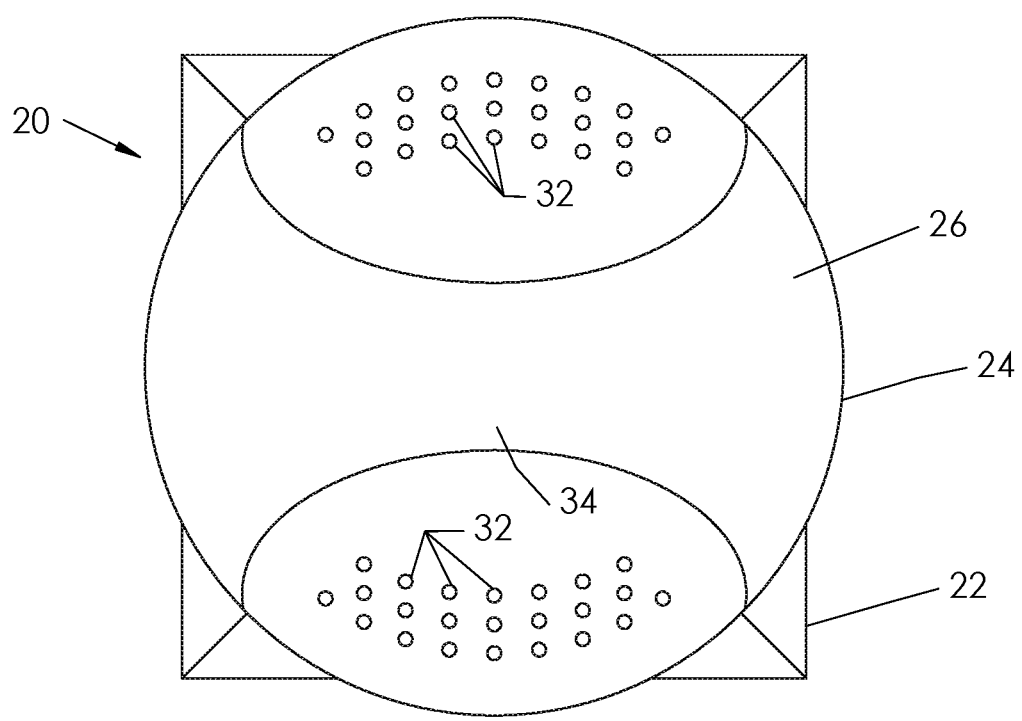
FIG. 4 is a front elevational view of an embodiment of the bumper plug of the invention, as seen along lines and arrows 4-4 of FIG. 2.

Collar 24 is connected to the housing 22 and, in the embodiment shown, has a circular configuration. The collar 24 defines art opening 29 that is in fluid communication with the cavity 21 defined by the housing 22. The opening 29 defined by the collar is sufficient to substantially or completely enclose and store the 4-in-1 adapter therein. As noted above, some inlet ports at RV dump stations require a 4.5 inch connector. With particular reference to FIGS. 3 and 7, the internal diameter "d" of the collar 24 will be sufficiently greater than 4.5 inches so as to permit the 4-in-1 adapter to fit within the opening 29 defined by the collar 24. In addition, the collar 24 will have a depth "x" sufficient to accommodate at least the 4.5 inch portion of the 4-in-1 adapter as seen in FIG. 7. This positioning will accommodate the 4-in-1 adapter in cavity 21 positioned proximal to, but exterior of bumper 14, a solution that is advantageous even without engagement with the 4-in-1 adapter via mechanical engagement members as described below.

Figure 6:
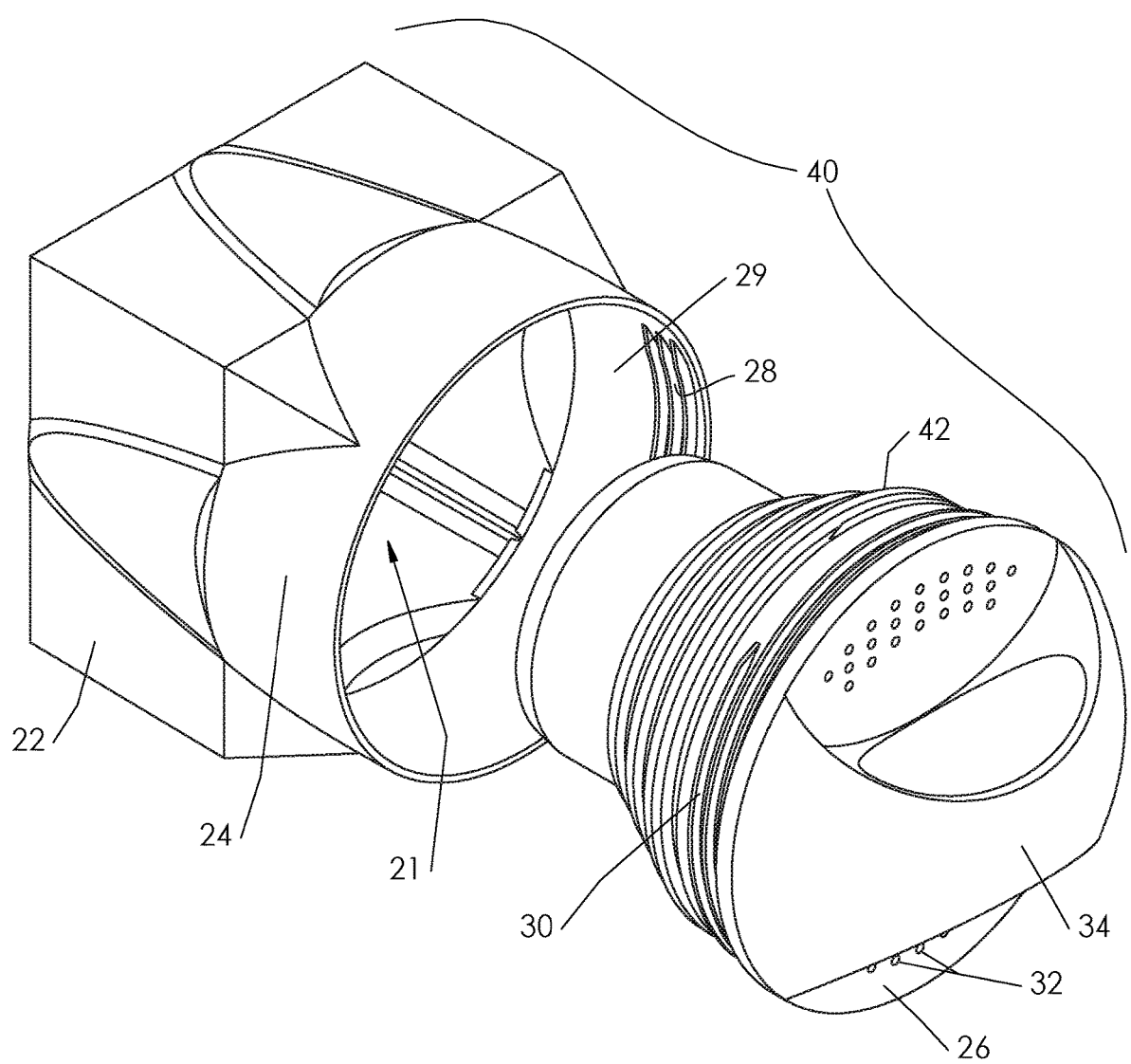
FIG. 6 is a partially exploded perspective view of an embodiment of the bumper plug of the invention, shown with the cap portion connected to a 4-in-1 adapter.

Collar 24 may be provided with engagement members such as threaded elements 28 on an internal surface of the collar. In a preferred embodiment, double start threads are employed to make it easier to thread the cap 26 into the collar 24. Note that only one of the double start thread segments is shown in FIGS. 3 and 6. While engagement members such as threaded elements 28, and most particularly double start threads, are preferred, other embodiments for attaching the cap 26 to the collar 24 are within the scope of the invention. For example, bail latches, elastomeric retention members, bayonet connections, or other structure(s) may be used to advantage to secure the cap 26 in place. In one more alternative embodiments, cap 26 may not be included with plug 20, or other members, structures, or the like may replace cap 26 while serving the same purpose, namely maintaining the 4-in-1 adapter proximal to, but exterior of bumper 14 within cavity 21.

Cap 26 preferably has threaded sections 30 on an external surface to engage with the threaded segments 28 on the interior surface of collar 24, thus providing a secure, threaded connection between the cap 26 and the collar 24. Cap 26, in the embodiment shown, has a plurality of vent holes 32 which will enable ventilation of the interior of bumper 14 when the plug 20 is in place. The vent holes 32 provide fluid communication with the opening 29 defined by the collar 24 and the cavity 21 defined by the housing 22. Ventilation is important to allow the sewer hose to dry and dissipate odors from the bumper cavity, while also preventing bugs, insects, rodents, and other pests from accessing the interior of bumper 14. A large handle 34 is provided on the cap 26 to enable the user to easily grasp and rotate the cap 26 and secure it in place within the collar 24.

With reference to FIGS. 6 and 7, the bumper plug 20 is shown assembled to a 4-in-1 adapter, with the assembly designated as 40 and the 4-in-1 adapter designated as 42. As seen in FIG. 5, the interior of the cap 26 is provided with one or more engagement portions, which in the preferred embodiment are defined as a plurality of spaced apart lugs 36 (FIG. 5). The lugs are configured (i.e. sized and shaped) to engage with one or more engagement portions of the 4-in-1 adapter 42, in the preferred embodiment represented as a pair of bayonet "channel" connections. This enables the user to attach and detach the 4-in-1 adapter to a dump station inlet port and also attach and detach the cap 26 to the bumper plug 20 without any physical contact between the user and the 4-in-1 adapter. In lieu of the lugs 36, other methods and structure to permit attachment and detachment of cap 26 and 4-in-1 adapter 42 may also be employed but this feature provides the user with an added measure of protection from contamination when using or storing the adapter 42. Further, one or more embodiments of bumper plug 20 may not include the engagement portion(s) described above, instead relying on the sizing of the 4-in-1 adapter relative to the size of the cavity defined by bumper 14 to maintain said adapter proximal to, but exterior of bumper 14 within cavity 21.

In application, the user attaches the bumper cap 20 to the bumper 14 of RV 10, preferably by sliding the housing 22 over the end 16 of bumper 14. The magnets 23 secure the housing 22 to the bumper 14. The cap 26 may be attached to a 4-in-1 adapter 42 by aligning the lugs 36 on the interior of the cap 26 with the bayonet slots (not shown) on the 4-in-1 adapter, and then rotating the cap (or the 4-in-1 adapter), in one non-limiting example a clockwise quarter turn. The cap 26 with the 4-in-1 adapter 42 connected thereto can then be engaged with the collar 24, in the preferred embodiment by threading the respective components thereto. Alternatively, the cap 26, with attached 4-in-1 adapter 42, can be attached to an inlet for a dump station. Once the 4-in-1 adapter is secured to the inlet, a quarter turn in the counterclockwise direction will release the cap from the 4-in-1 adapter to permit attachment of the sewer hose to the 4-in-1 adapter.

The bumper plug 20 is preferably made from a rigid, durable, weather-resistant material. Plastic materials are most preferred, including acrylonitrile butadiene styrene copolymer ("ABS"), reinforced nylon, polyethylene, polycarbonate, polyoxymethylene, acrylic resin, etc. The bumper plug may be made by any suitable process, such as injection molding, casting, machining or the like. In a preferred embodiment, the collar and housing are a single integrated piece formed from a molding or casting. However, it is understood that the collar may be formed as separate piece from the housing and then secured thereto by any suitable means, such as by use of adhesives, mechanical fasteners, welding, etc.

The illustrations and examples provided herein are for explanatory purposes and are not intended to limit the scope of the appended claims.

I claim:

1. A plug for a bumper comprising: a housing defining a cavity; a collar affixed to and extending from the housing, the collar defining an opening in communication with the cavity; said opening and said collar defining size and shape sufficient to receive a 4-in-1 adapter therein, a cap removably connected to the collar, wherein the collar has a first engagement segment and said cap has a second engagement segment, thereby facilitating a connection between the collar and the cap.

2. The plug of claim 1, wherein the collar has a first engagement segment on an internal surface thereof and said cap has a second engagement segment on a circumferential surface thereof, thereby facilitating a connection between the collar and the cap.

3. The plug of claim 1, wherein the collar has a threaded segment on an internal surface thereof and said cap has a threaded segment on a circumferential surface thereof, thereby providing a threaded connection between the collar and the cap.

4. The plug of claim 1, wherein the cap further comprises a plurality of apertures, said apertures providing fluid communication with said opening and said cavity.

5. The plug of claim 1, wherein the housing is sized to fit over an open end of a bumper, whereby an open end of a bumper is received within said cavity.

6. The plug of claim 1, wherein the housing is sized to fit over an open end of a bumper, whereby an open end of a bumper is received within said cavity, and wherein said housing further comprises a plurality of magnets for magnetic attachment of the plug to a bumper.

7. The plug of claim 1, wherein the housing is sized to fit over an open end of a bumper, whereby an open end of a bumper is received within said cavity, wherein said housing further comprises a plurality of magnets for magnetic attachment of the plug to a bumper, and wherein said magnets are positioned at corners on an interior surface of the housing.

8. The plug of claim 1, wherein the collar is circular in cross-section; wherein the housing is square in cross-section, and wherein the diameter of the collar is greater than the dimension across the housing.

9. The plug of claim 1, wherein the collar has a threaded segment on an internal surface thereof and said cap has a threaded segment on a circumferential surface thereof, thereby providing a threaded connection between the collar and the cap, the cap further comprising a handle to facilitate rotation of the cap.

10. The plug of claim 1, wherein the collar has a threaded segment on an internal surface thereof and said cap has a threaded segment on a circumferential surface thereof, thereby providing a threaded connection between the collar and the cap, the cap further comprising a handle to facilitate rotation of the cap, and wherein the threaded segment on the internal surface of the collar comprises double start threaded segments.

11. The plug of claim 1 further defining a plurality of spaced-apart lugs on an interior surface of the cap, said lugs adapted for removably connecting the cap to a 4-in-1 adapter.

12. A plug for a bumper comprising: a housing defining a cavity; a collar affixed to and extending from the housing, the collar defining an opening in communication with the cavity; a cap removably connected to the collar; the cap having a plurality of spaced-apart lugs on an interior surface thereof, said lugs adapted for removably connecting the cap to a 4-in-1 adapter; said opening and said collar defining a size and shape sufficient to receive the 4-in-1 adapter therein; wherein the collar has a threaded segment on an internal surface thereof and said cap has a threaded segment on a circumferential surface thereof, thereby providing a threaded connection between the collar and the cap, wherein the threaded segment on the collar comprises double start threaded segments; wherein the cap further comprising a handle to facilitate rotation of the cap; wherein the collar is circular in cross-section; wherein the housing is square in cross-section, and wherein the diameter of the collar is greater than the dimension across the housing; wherein the cap further comprises a plurality of apertures, said apertures providing fluid communication with said opening and said cavity; wherein the housing is sized to fit over an open end of a bumper, whereby an open end of a bumper is received within said cavity, and wherein said housing further comprises a plurality of magnets for magnetic attachment of the plug to a bumper, wherein said magnets are located at corners on an interior surface of the housing.

13. A plug for a bumper in combination with a 4-in-1 adapter, the combination comprising a plug defining a housing with a cavity; a collar affixed to and extending from the housing, the collar defining an opening in communication with the cavity; a cap removably connected to the collar, the cap defining one or more engagement portions on an interior surface thereof; and a 4-in-1 adapter including one or more engagement portions;

wherein the cap one or more engagement portions are adapted for removably connecting the plug to the 4-in-1 adapter one or more engagement portions, and wherein the opening of the collar defines a size and shape sufficient to receive the 4-1 adapter therein.

14. The combination of claim 13, wherein the collar has a first engagement segment on an internal surface thereof and said cap has a second engagement segment on a circumferential surface thereof, thereby facilitating a connection between the collar and the cap.

15. The combination of claim 13, wherein the collar has a threaded segment on an internal surface thereof and said cap has a threaded segment on a circumferential surface thereof, thereby providing a threaded connection between the collar and the cap.

16. The combination of claim 13, wherein the cap further comprises a plurality of small scale apertures, said apertures providing fluid communication with said opening and said cavity.

17. The combination of claim 13, wherein the cap one or more engagement portions are defined as a plurality of lugs, and wherein the 4-in-1 adapter one or more engagement portions are defined as a plurality of bayonet channels.

18. The combination of claim 17, wherein the housing is sized to fit over an open end of a bumper, whereby an open end of a bumper is received within said cavity, and wherein said housing further comprises a plurality of magnets for magnetic attachment of the plug to a bumper, wherein said magnets are positioned at corners on an interior surface of the housing.

19. The combination of claim 17, wherein the collar has a threaded segment on an internal surface thereof and said cap has a threaded segment on a circumferential surface thereof, thereby providing a threaded connection between the collar and the cap, the cap further comprising a handle to facilitate rotation of the cap.

20. The combination of claim 19, wherein the threaded segment on the internal surface of the collar defines double start threaded segments.

\* \* \* \* \*